(12) United States Patent
Ohmori

(10) Patent No.: US 10,505,214 B2
(45) Date of Patent: Dec. 10, 2019

(54) FUEL CELL STACK

(71) Applicant: NGK INSULATORS, LTD., Nagoya-shi, Aichi (JP)

(72) Inventor: Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 226 days.

(21) Appl. No.: 15/421,572

(22) Filed: Feb. 1, 2017

(65) Prior Publication Data

US 2017/0141426 A1 May 18, 2017

Related U.S. Application Data

(63) Continuation of application No. PCT/JP2016/068954, filed on Jun. 27, 2016.

(30) Foreign Application Priority Data

Jul. 3, 2015 (JP) .................................. 2015-134102
Jun. 23, 2016 (JP) .................................. 2016-124349

(Continued)

(51) Int. Cl.
*H01M 8/00* (2016.01)
*H01M 8/2483* (2016.01)
(Continued)

(52) U.S. Cl.
CPC ..... *H01M 8/2483* (2016.02); *H01M 8/04089* (2013.01); *H01M 8/04201* (2013.01);
(Continued)

(58) Field of Classification Search
CPC ........... H01M 8/2484; H01M 8/04089; H01M 8/0421; H01M 8/2485; H01M 8/2483
See application file for complete search history.

(56) References Cited

U.S. PATENT DOCUMENTS

2006/0147778 A1 7/2006 Matsuzaki et al.
2007/0259242 A1 11/2007 Schaevitz et al.
(Continued)

FOREIGN PATENT DOCUMENTS

CN 1632976 A 6/2005
CN 103081199 A 5/2013
(Continued)

OTHER PUBLICATIONS

International Search Report for the corresponding international application No. PCT/JP2016/068954 dated Sep. 27, 2016.
(Continued)

*Primary Examiner* — Cynthia H Kelly
*Assistant Examiner* — Monique M Wills
(74) *Attorney, Agent, or Firm* — Global IP Counselors, LLP

(57) ABSTRACT

A fuel cell stack (100) includes a first power generation element, a first supporting substrate (5a), a second power generation element, a second supporting substrate (5b) and a communicating member (3). The first supporting substrate (5a) includes a first substrate main portion, a first dense layer, and a first gas flow passage. The first dense layer covers the first substrate main portion. The first gas flow passage extends from a proximal end portion (501a) to a distal end portion (502a). The second supporting substrate (5b) includes a second substrate main portion, a second dense layer, and a second gas flow passage. The second dense layer covers the second substrate main portion. The second gas flow passage extends from a proximal end portion (501b) to a distal end portion (501b). The communicating member (3) extends between the distal end portion (502a) of the first supporting substrate (5a) and the distal end portion (502b) of the second supporting substrate (5b)

(Continued)

and communicates between the first gas flow passage and the second gas flow passage.

22 Claims, 12 Drawing Sheets

(30) Foreign Application Priority Data

| | | | |
|---|---|---|---|
| Jun. 23, 2016 | (JP) | ................................ | 2016-124350 |
| Jun. 23, 2016 | (JP) | ................................ | 2016-124351 |
| Jun. 23, 2016 | (JP) | ................................ | 2016-124352 |
| Jun. 23, 2016 | (JP) | ................................ | 2016-124353 |

(51) Int. Cl.

| | |
|---|---|
| *H01M 8/2484* | (2016.01) |
| *H01M 8/04089* | (2016.01) |
| *H01M 8/04082* | (2016.01) |
| *H01M 8/2485* | (2016.01) |
| *H01M 8/247* | (2016.01) |
| *H01M 8/249* | (2016.01) |

(52) U.S. Cl.
CPC .......... *H01M 8/247* (2013.01); *H01M 8/249* (2013.01); *H01M 8/2484* (2016.02); *H01M 8/2485* (2013.01); *Y02P 70/56* (2015.11)

(56) References Cited

U.S. PATENT DOCUMENTS

| | | | |
|---|---|---|---|
| 2008/0038621 A1 | 2/2008 | Ichigi et al. | |
| 2011/0065022 A1 | 3/2011 | Min et al. | |
| 2012/0107715 A1 | 5/2012 | Ohmori et al. | |
| 2014/0004439 A1 | 1/2014 | Ohmori et al. | |
| 2014/0315111 A1 | 10/2014 | Sato et al. | |
| 2016/0164128 A1* | 6/2016 | Ono ........................ | C25B 15/08 429/418 |

FOREIGN PATENT DOCUMENTS

| | | |
|---|---|---|
| JP | 6-310165 A | 11/1994 |
| JP | 2007-335213 A | 12/2007 |
| JP | 2008-66296 A | 3/2008 |
| JP | 2009-224299 A | 10/2009 |
| JP | 2011-60747 A | 3/2011 |
| JP | 2014-132518 A | 7/2014 |
| JP | 5551803 B1 | 7/2014 |
| JP | 2015-53186 A | 3/2015 |

OTHER PUBLICATIONS

An English Translation of the Written Opinion of the International Search Authority for the corresponding international application No. PCT/JP2016/068954, dated Sep. 27, 2016.

An English Translation of the International Preliminary Report on Patentability for the corresponding international application No. PCT/JP2016/068954, dated Jan. 9, 2018.

The Office Action of the U.S. Appl. No. 15/431,026 dated Jun. 24, 2019.

* cited by examiner

FUEL CELL STACK

TECHNICAL FIELD

The present invention relates to a fuel cell stack.

BACKGROUND ART

A fuel cell stack is known that includes a plurality of cells and a manifold configured to distribute gas to the respective cells. Each cell includes a porous supporting substrate and a power generation element configured to be supported by each supporting substrate. Fuel gas is supplied from the manifold to a gas flow passage in each supporting substrate by insertion of a proximal end portion of each supporting substrate into the manifold. Unreacted gas of the fuel gas that is supplied from the proximal end portion of the gas flow passage of each supporting substrate is discharged to an external portion from a distal end portion of the gas flow passage.

The fuel cell stack disclosed in Patent Literature 1 is configured to recover unreacted gas discharged from the distal end portion to an external portion in order to enhance the operating efficiency of the fuel gas. More specifically, the supporting substrate includes an outward gas flow passage and a return gas flow passage. The unreacted gas of the fuel gas supplied to the outward gas flow passage is re-used in power generated by the return gas flow passage. The fuel gas flowing in the return gas flow passage is not discharged from a distal end portion to an external portion, but rather is recovered from the proximal end portion to the manifold.

Since the supporting substrate is porous, the fuel gas may flow into the return gas flow passage without flowing to the end of the outward gas flow passage. That is to say, the fuel gas may flow within the supporting substrate along the outward gas flow passage and into the return gas flow passage. To prevent this type of short cut, a dense member is inserted between the outward gas flow passage and the return gas flow passage.

CITATION LIST

Patent Literature

[Patent Literature 1] Japanese Patent Application Laid-Open No. 2015-53186

SUMMARY OF INVENTION

Technical Problem

The fuel cell stack discussed above has problems related to difficulty of manufacture due to the requirement of insertion of a dense member into an inner portion of the porous supporting substrate. The problem of the present invention is to provide a fuel cell stack that can recover gas while facilitating manufacturing.

Solution to Problem

The fuel cell stack according to one aspect of the present invention includes a first power generation element, a first supporting substrate, a second power generation element, a second supporting substrate and a communicating member. The first power generation element includes a first anode, a first electrolyte and a first cathode. The first supporting substrate includes a first substrate main portion, a first dense layer, and a first gas flow passage. The first substrate main portion supports the first power generation element. The first dense layer covers the first substrate main portion. The first gas flow passage extends from a proximal end portion to a distal end portion. The second power generation element includes a second anode, a second electrolyte and a second cathode. The second supporting substrate includes a second substrate main portion, a second dense layer, and a second gas flow passage. The second substrate main portion supports the second power generation element. The second dense layer covers the second substrate main portion. The second gas flow passage extends from a proximal end portion to a distal end portion. The communicating member extends between the distal end portion of the first supporting substrate and the distal end portion of the second supporting substrate and communicates between the first gas flow passage and the second gas flow passage.

The above configuration enables the unreacted gas of the fuel gas that flows in the first gas flow passage of the first supporting substrate to flow through the communicating member into the second gas flow passage without being discharged from the distal end portion of the first gas flow passage into an external portion. Consequently, it is possible to enhance the operating efficiency in relation to fuel gas. Furthermore, the first supporting substrate includes the first dense layer configured to cover the first substrate main portion. The second supporting substrate includes the second dense layer configured to cover the second substrate main portion. The first and second dense layers are denser than the first and second substrate main portions, and therefore the fuel gas that flows in the first gas flow passage can be inhibited from flowing through the first and second substrate main portions into the second gas flow passage. Furthermore, the first dense layer may be simply formed to merely cover the first substrate main portion.

It is preferred that the first supporting substrate and the second supporting substrate are disposed so that a side surface of the first supporting substrate faces a side surface of the second supporting substrate.

The first supporting substrate and the second supporting substrate may be mutually disposed at an interval. For example, when the fuel cell stack has a large configuration that includes a plurality of cells, the temperature distribution in the stack can be made uniform by causing air to flow in such an interval.

The first supporting substrate and the second supporting substrate may be disposed side by side in a transverse direction. The interval between the first supporting substrate and the second supporting substrate may be sealed. In such a configuration, the interval between the first supporting substrate and the second supporting substrate is sealed in a transverse direction. Consequently, when air flows along the principal surfaces of the first supporting substrate and the second supporting substrate for example, the air can be prevented from escaping from the interval between the first supporting substrate and the second supporting substrate.

The first supporting substrate and the second supporting substrate may be disposed side by side in mutual contact in a transverse direction.

The fuel cell stack may further include a filling member. The filling member is disposed to fill the space between the first supporting substrate and the second supporting substrate that are mutually disposed with an interval.

It is preferred that the fuel cell stack includes a plurality of the first supporting substrates and a plurality of the second supporting substrates. Each first supporting substrate is disposed with an interval so that the principal surfaces thereof are opposed. Each second supporting substrate is disposed with an interval so that the principal surfaces thereof are opposed. Each first supporting substrate is disposed side by side in a transverse direction with each second supporting substrate. The interval between at least one pair of the first supporting substrate and the second supporting substrate is sealed.

It is preferred that the communicating member includes a passage that communicates between the first gas flow passage and the second gas flow passage.

The communicating member may be porous. In this configuration, the communicating member preferably includes a third dense layer that configures an outer surface. Furthermore, the passage described above may be configured by pores in the communicating member.

The communicating member may include a space that extends from the first gas flow passage to the second gas flow passage as the passage above configured.

The communicating member may be configured by metal.

It is preferred that the fuel cell stack includes a plurality of the first power generation elements and a plurality of the second power generation elements. Each of the first power generation elements is disposed with an interval along the longitudinal direction of the first supporting substrate. Each of the second power generation elements is disposed with an interval along the longitudinal direction of the second supporting substrate.

It is preferred that the fuel cell stack further includes a manifold that supports the first and second supporting substrates. Fuel gas can be distributed into each gas flow passage by the manifold.

It is preferred that the manifold includes a first chamber and a second chamber. The first gas flow passage communicates with the first chamber. The second gas flow passage communicates with the second chamber. This configuration enables fuel gas to flow smoothly in sequence into the first gas flow passage, the communicating member, and the second gas flow passage by supplying fuel gas to the first chamber.

The manifold may include a manifold main portion and a partition. The manifold main portion includes a cavity. The partition partitions the cavity into the first chamber and the second chamber. This configuration facilitates manufacture of the manifold that includes the first chamber and the second chamber.

The manifold may include a first manifold main portion and a second manifold main portion. The first manifold main portion includes the first chamber. The second manifold main portion includes the second chamber.

It is preferred that the manifold further comprises a gas supply portion and a gas discharge portion. The gas supply portion is connected to the first chamber. The gas discharge portion is connected to the second chamber.

The gas supply portion may be formed on a first side plate of the manifold, and the gas discharge portion may be formed on a second side plate of the manifold. The first side plate and the second side plate of the manifold are disposed on mutually opposite sides.

The gas supply portion and the gas discharge portion may be formed on the first side plate of the manifold.

It is preferred that the fuel cell stack may be provided with a plurality of the first supporting substrates and a plurality of the second supporting substrates. Each of the first supporting substrates is mutually disposed at an interval in a direction that is faced by the first side plate. Each of the second supporting substrates is mutually disposed at an interval in a direction that is faced by the first side plate.

It is preferred that the first dense layer includes the first electrolyte, and the second dense layer includes the second electrolyte.

Advantageous Effects of Invention

The fuel cell stack according to the present invention can recover gas while facilitating manufacturing of the fuel cell stack.

DESCRIPTION OF EMBODIMENTS

Figure 1:
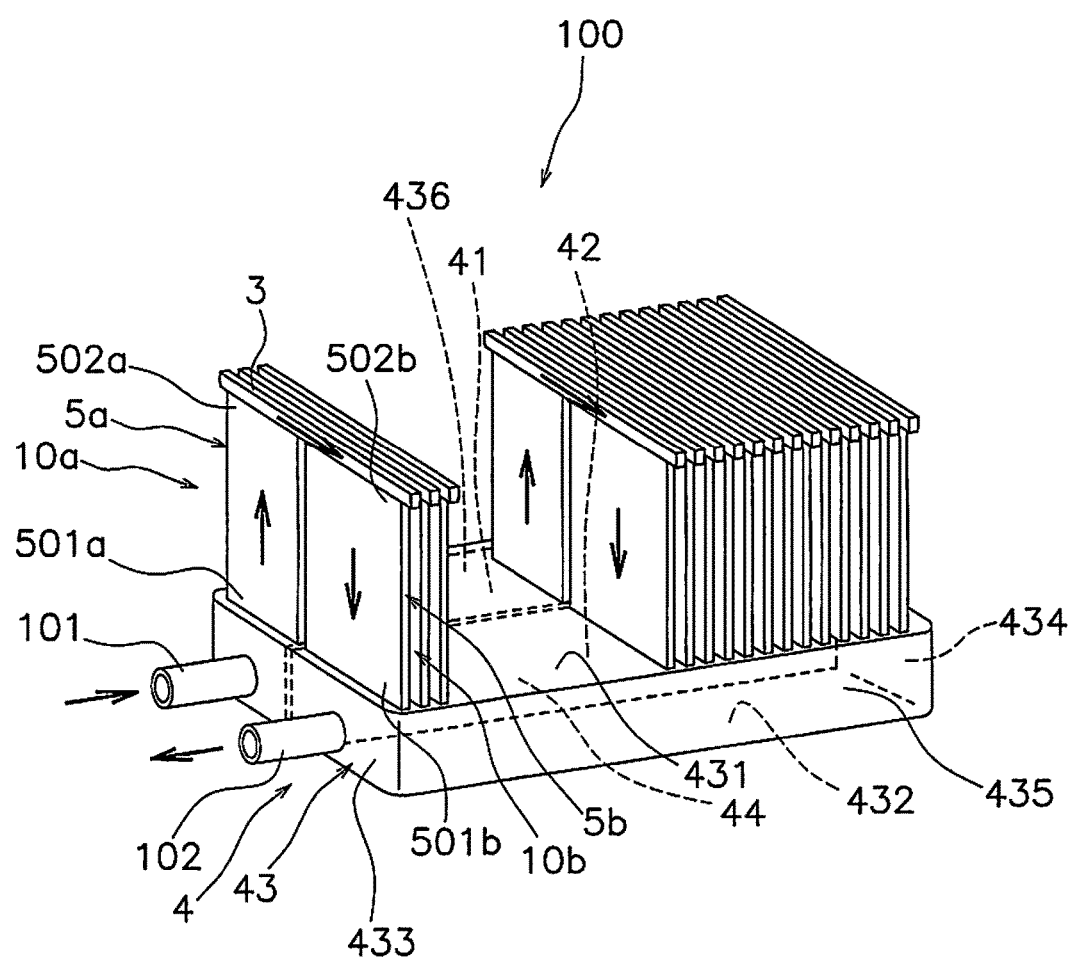
FIG. 1 is a perspective view of a fuel cell stack.

An embodiment of a fuel cell stack according to the present invention will be described below making reference to the figures. FIG. 1 is a perspective view of the fuel cell stack. FIG. 1 omits illustration of several first and second cells.

Fuel Cell Stack

As illustrated in FIG. 1, a fuel cell stack 100 includes a plurality of first cells 10a, a plurality of second cells 10b, a communicating member 3, and a manifold 4. In the following description, the letter "a" is applied to the end of the reference numeral of constituent members of the first cells 10a, and the letter "b" is applied to the end of the reference numeral of constituent members of the second cells 10b. The first cells 10a and the second cells 10b have substantially the same configuration, and therefore only the constituent members of the first cells 10a will be described below. Detailed description of the constituent members of the second cells 10b by addition of a reference numeral corresponding to the constituent members of the first cells 10a will be omitted.

Manifold

The manifold 4 is configured to support the first and second cells 10a, 10b. The manifold 4 includes a first chamber 41 and a second chamber 42. The manifold 4 includes a gas supply portion 101 that is connected to the first chamber 41 and a gas discharge portion 102 that is connected to the second chamber 42. The first chamber 41 is supplied with fuel gas through the gas supply portion 101. Furthermore, fuel gas in the second chamber 42 is discharged from the manifold 4 through the gas discharge portion 102.

The manifold 4 includes a manifold main portion 43 and a partition 44. The inner portion of the manifold main portion 43 includes a cavity. The manifold main portion 43 has a rectangular parallelopiped shape. The manifold main portion 43 has an upper plate 431, a bottom plate 432, a first side plate 433, a second side plate 434, a third side plate 435, and a fourth side plate 436.

The first to the fourth side plates 433 to 436 extend upwardly from the peripheral portion of the bottom plate 432. The first side plate 433 and the second side plate 434 are disposed on mutually opposite sides. The third side plate 435 and the fourth side plate 436 are disposed on mutually opposite sides. The upper plate 431 is disposed to seal the upper surface of the manifold main portion 43. The upper plate 431, the bottom plate 432, the first side plate 433, the second side plate 434, the third side plate 435, and the fourth side plate 436 are integrally formed.

The upper plate 431 of the manifold main portion 43 forms a plurality of first and second insertion holes (illustration omitted). The first cells 10a are inserted into the first insertion holes and the second cells 10b are inserted into the second insertion holes. The first insertion holes communicate with the first chamber 41 and the second insertion holes communicate with the second chamber 42.

Each of the first insertion holes is arranged side by side with an interval in the longitudinal direction (z axis direction) of the manifold main portion 43. That is to say, each first insertion hole is formed mutually with an interval in a direction faced by the first side plate 433. Each of the second insertion holes is also arranged side by side with an interval in the longitudinal direction (z axis direction) of the manifold main portion 43. That is to say, each second insertion hole is formed mutually with an interval in a direction faced by the first side plate 433. The first insertion holes and the second insertion holes are arranged side by side with an interval in the transverse direction (y axis direction) of the manifold main portion 43.

The gas supply portion 101 is formed on the first side plate 433. The gas discharge portion 102 is also formed on the first side plate 433. That is to say, the gas supply portion 101 and the gas discharge portion 102 are formed on the side first side plate 433.

The partition 44 partitions the cavity of the manifold main portion 43 into the first chamber 41 and the second chamber 42. More specifically, the partition 44 extends in a longitudinal direction of the manifold main portion 43 in approximately the central portion of the manifold main portion 43. The partition 44 preferably completely partitions the cavity of the manifold main portion 43. However, a space may be formed between the partition 44 and the manifold main portion 43.

First Cell

The first cells 10a are disposed above the first chamber 41 of the manifold 4. The first cells 10a are inserted into the first insertion holes of the manifold 4. The second cells 10b are disposed above the second chamber 42 of the manifold 4. The second cells 10b are inserted into the second insertion holes of the manifold 4.

Each first cell 10a is arranged so that the principal surfaces thereof are facing. Furthermore, each first cell 10a is arranged with an interval along the longitudinal direction of the manifold 4. Each second cell 10b is arranged so that the principal surfaces thereof are facing. Furthermore, each second cell 10b is arranged with an interval along the longitudinal direction of the manifold 4. The row of first cells 10a and the row of second cells 10b are disposed in a substantially parallel configuration. The first cells 10a and the second cells 10b are disposed so that the side surfaces are facing.

Figure 2:
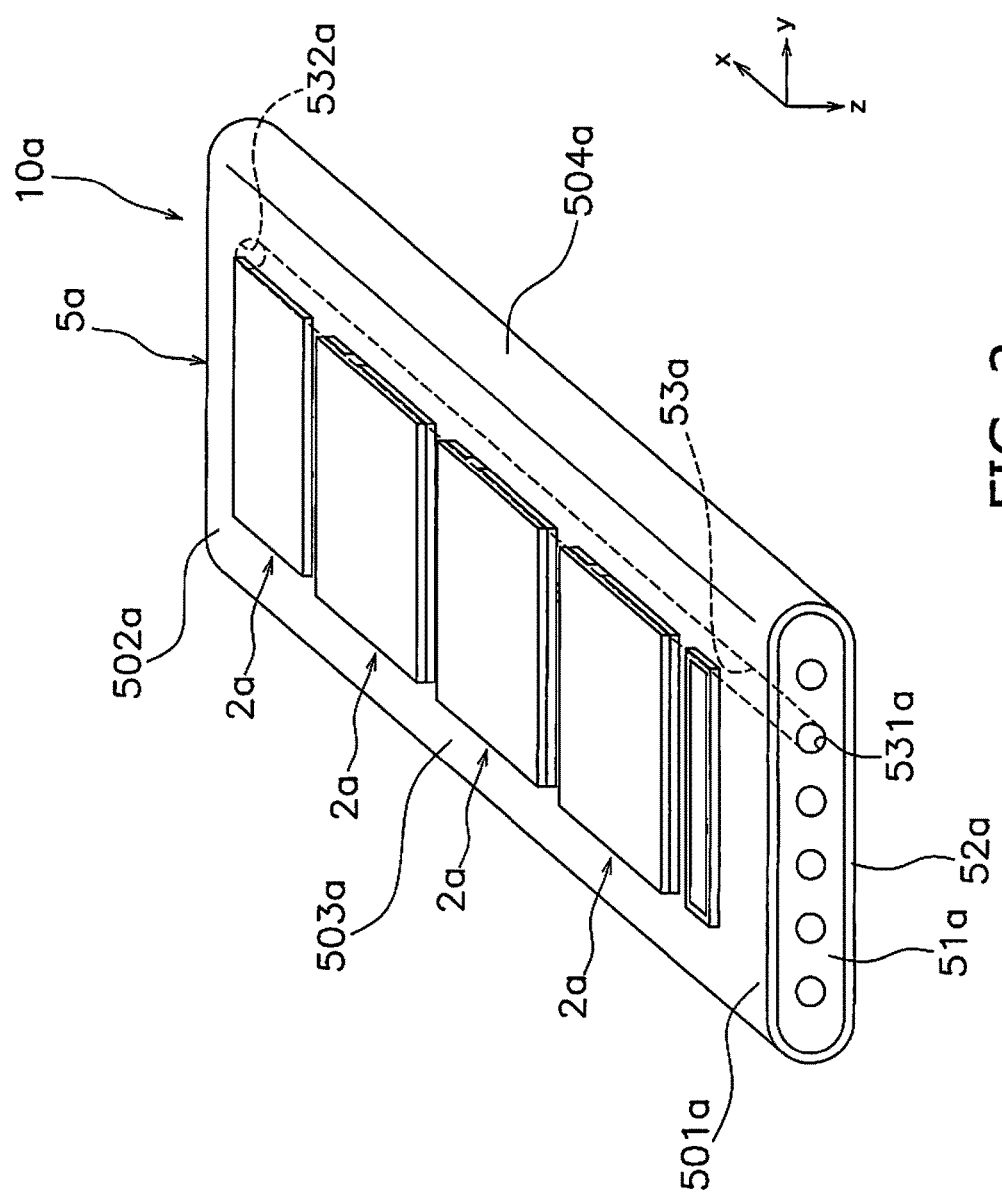
FIG. 2 is a perspective view of a first cell.

As illustrated in FIG. 2, the first cells 10a include a first supporting substrate 5a, and a plurality of first power generation elements 2a. The first power generation elements 2a may be supported by only one of the principal surfaces 503a of the first supporting substrate 5a, but may be supported by both the principal surfaces 503a of the first supporting substrate 5a. In the present embodiment, the first power generation elements 2a are supported on both the principal surfaces 503a of the first supporting substrate 5a. Each first power generation element 2a is electrically connected by a first electrical connection portion (reference is made to FIG. 3).

First Supporting Substrate

The first supporting substrate 5a includes a first substrate main portion 51a, a first dense layer 52a, and a plurality of first gas flow passages 53a. The first supporting substrate 5a includes a proximal end portion 501a and a distal end portion 502a. The proximal end portion 501a and the distal end portion 502a are both end portions in the longitudinal direction (x axis direction) of the first supporting substrate 5a. The proximal end portion 501a of the first substrate 5a is inserted into the first insertion holes of the manifold 4.

The first supporting substrate 5a includes two principal surfaces 503a and two side surfaces 504a. Each principal surface 503a supports each first power generation element 2a. Each principal surface 503a faces the direction of thickness direction (z axis direction) of the first supporting substrate 5a. Each side surface 504a faces the transverse direction (y axis direction) of the first supporting substrate 5a. Each side surface 504a may be curved. As illustrated in FIG. 1, each first support substrate 5a is disposed with an interval so that both principal surfaces 503a are facing. Each first supporting substrate 5a is disposed with an interval in a direction (z axis direction) faced by the first side plate 433.

As illustrated in FIG. 2, the first substrate main portion 51a supports the first power generation element 2a. The first substrate main portion 51a is configured from a porous material that does not exhibit electrical conductivity. The first substrate main portion 51a is configured for example from CSZ (calcia-stabilized zirconia). In addition, the first substrate main portion 51a may be configured from NiO (nickel oxide) and YSZ (8YSZ) (yttria-stabilized zirconia), may be configured by NiO (nickel oxide) and $Y_2O_3$ (yttria), or may be configured by MgO (magnesium oxide) and $MgAl_2O_4$ (magnesia alumina spinel). The porosity of the first substrate main portion 51a is for example about 20 to 60%. For example, the porosity is measured by an Archimedes method or by microscopic observation.

The first dense layer 52a covers the first substrate main portion 51a. The first dense layer 52a may be configured to inhibit flow of fuel gas that is flowing in the first gas flow passage 53a through the first substrate main portion 51a to the second gas flow passage 53b, and there is no requirement to cover the entire surface of the first substrate main portion 51a. In the present embodiment, the first dense layer 52a covers each principal surface and each side surface of the first substrate main portion 51a. That is to say, the first dense layer 52a configures each principal surface 503a of the first supporting substrate 5a, and configures each side surface 504a of the first supporting substrate 5a. In the present embodiment, the first dense layer 52a is configured by a first electrolyte 7a described below and a first interconnector 91a. The first dense layer 52a is denser than the first substrate main portion 51a. For example, the porosity of the first dense layer 52a is about 0-7%.

The first gas flow passage 53a extends from the proximal end portion 501a to the distal end portion 502a of the first supporting substrate 5a. The first gas flow passage 53a extends along the longitudinal direction (x axis direction) of the first supporting substrate 5a. Furthermore, the first gas flow passage 53a extends through the first substrate main portion 51a. The proximal end portion 531a of the first gas flow passage 53a communicates with the first chamber 41. Furthermore, the distal end portion 532a of the first gas flow passage 53a communicates with the flow passage 30 of the communicating member 3 described below.

First Power Generation Element

Figure 3:
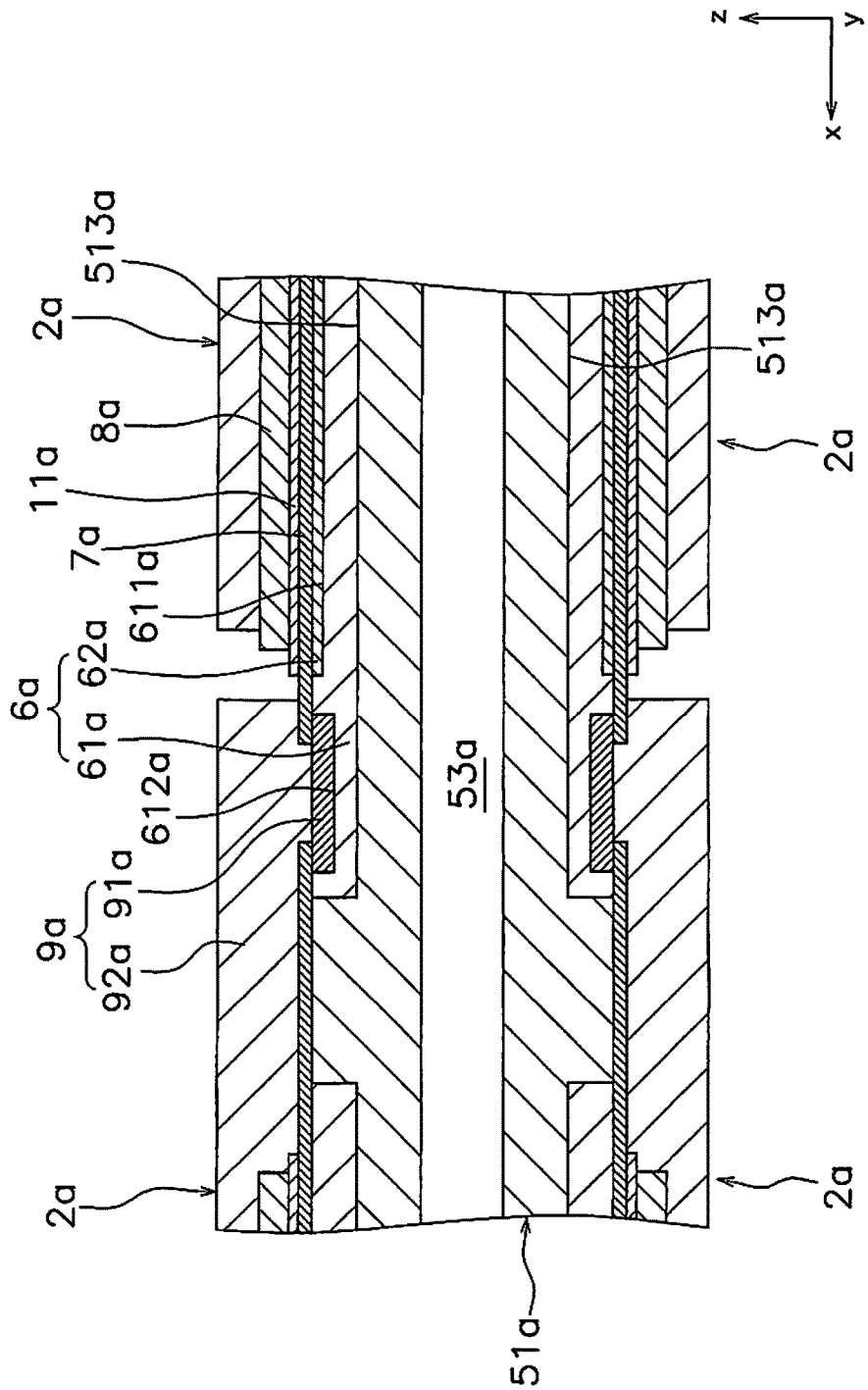
FIG. 3 is a sectional view of the first cell.

As illustrated in FIG. 3, the first power generation element 2a includes a first anode 6a, a first electrolyte 7a and a first cathode 8a. The first power generation element 2a further includes a first reaction prevention membrane 11a. The first anode 6a is configured as a fired body formed from a porous material that exhibits electrical conductivity. The first anode 6a includes a first anode current collection portion 61a and an anode active portion 62a.

The first anode current collection portion 61a is disposed in a recessed portion 513a. The recessed portion 513a is formed on both surfaces of the first substrate main portion 51a. More specifically, the first anode current collection portion 61a is filled into the recessed portion 513a, to thereby have the same external shape as the recessed portion 513a. Each of the first anode current collection portions 61a has a recessed portion 611a and a recessed portion 612a. The anode active portion 62a is disposed in the recessed portion 611a. More specifically, the anode active portion 62a is filled into the recessed portion 611a.

The first anode current collection portion 61a for example is configured by NiO (nickel oxide) and YSZ (8YSZ) (yttria-stabilized zirconia). Alternatively, the first anode current collection portion 61a may be configured by NiO (nickel oxide) and $Y_2O_3$ (yttria), or configured by NiO (nickel oxide) and CSZ (calcia-stabilized zirconia). The thickness of the first anode current collection portion 61a and the depth of the recessed portion 513a are about 50 to 500 microns.

The anode active portion 62a for example is configured by NiO (nickel oxide) and YSZ (8YSZ) (yttria-stabilized zirconia). Alternatively, the anode active portion 62a may be configured by NiO (nickel oxide) and GDC (gadolinium doped ceria). The thickness of the anode active portion 62a is about 5 to 30 microns.

The first electrolyte 7a is disposed to cover the first anode 6a. More specifically, the first electrolyte 7a extends in a longitudinal direction from one first interconnector 93a to another first interconnector 91a. That is to say, the first electrolyte 7a is disposed in an alternating configuration with the first interconnector 91a in a longitudinal direction. The first electrolyte 7a covers each principal surface and each side surface of the first substrate main portion 51a.

The first electrolyte 7a is denser than the first substrate main portion 51a. For example, the porosity of the first electrolyte 7a is about 0 to 7%. The first electrolyte 7a is configured as a fired body formed from a dense material that exhibits ionic conductivity but that does not exhibit electrical conductivity. The first electrolyte 7a for example is configured by YSZ (8YSZ) (yttria-stabilized zirconia). Alternatively, the first electrolyte 7a may be configured by LSGM (lanthanum gallate). The thickness of the first electrolyte 7a is for example about 3 to 50 microns.

The first reaction prevention membrane 11a is configured as a fired body formed from a dense material, and when viewed in plan, has approximately the same shape as the anode active portion 62a. The first reaction prevention membrane 11a is disposed through the first electrolyte 7a at a position that corresponds to the anode active portion 62a. The first reaction prevention membrane 11a is disposed to prevent an occurrence of a phenomenon in which a reaction layer is formed that exhibits a large electrical resistance at the interface of the first electrolyte 7a and the first cathode 8a as a result of a reaction between Sr in the first cathode 8a with YSZ in the first electrolyte 7a. The first reaction prevention membrane 11a for example is configured from GDC=(Ce,Gd)$O_2$ (gadolinium doped ceria). The thickness of the first reaction prevention membrane 11a is for example about 3 to 50 microns.

The first cathode 8a is disposed on the first reaction prevention membrane 11a. The first cathode 8a is configured as a fired body formed from a porous material that exhibits electrical conductivity. The first cathode 8a is configured from LSCF=(La, Sr) (Co, Fe)$O_3$ (lanthanum strontium cobalt ferrite). Alternatively, it may be configured from LSF=(La, Sr) Fe$O_3$ (lanthanum strontium ferrite), LNF=La (Ni, Fe) $O_3$ (lanthanum nickel ferrite), LSC=(La, Sr)Co$O_3$ (lanthanum strontium cobaltite, or the like. Furthermore, the first cathode 8a may be configured from two layers being a first layer (inner layer) formed from LSCF and a second layer (outer layer) formed from LSC. The thickness of the first cathode 8a is for example 10 to 100 microns.

The first electrical connection portion 9a is configured so that adjacent first power generation elements 2a are electrically connected. The first electrical connection portion 9a includes a first interconnector 91a and a first cathode current collection portion 92a. The first interconnector 91a is disposed in the recessed portion 612a. More specifically, the first interconnector 91a is embedded (filled) into the recessed portion 612a. The first interconnector 91a is configured as a fired body formed from a dense material that exhibits electrical conductivity. The first interconnector 91a is denser than the first substrate main portion 51a. For example, the porosity of the first interconnector 91a is about 0 to 7%. The first interconnector 91a is configured for example from LaCr$O_3$ (lanthanum chromite), or may be configured by (Sr, La) Ti$O_3$ (strontium titanate). The thickness of the first interconnector 91a is for example 10 to 100 microns.

The first cathode current collection membrane 92a is disposed to extend between the first cathode 8a and the first interconnector 91a of adjacent first power generation elements 2a. For example, the first cathode current collection membrane 92a is disposed to electrically connect the first interconnector 91a of the first power generation element 2a disposed on the right side of FIG. 3 with the first cathode 8a of the first power generation portion 2a disposed on the left side of FIG. 3. The first cathode current collection membrane 92a is configured as a fired body formed from a porous material that exhibits electrical conductivity.

The first cathode current collection membrane 92a may be configured from LSCF=(La, Sr) (Co, Fe)$O_3$ (lanthanum strontium cobalt ferrite). Alternatively, it may be configured from LSC=(La, Sr) Co$O_3$ (lanthanum strontium cobaltite), or it may be configured from Ag (silver), Ag—Pd (silver palladium alloy). The thickness of the first cathode current collection membrane 92a is for example 50 to 500 microns.

Second Cell

Figure 4:
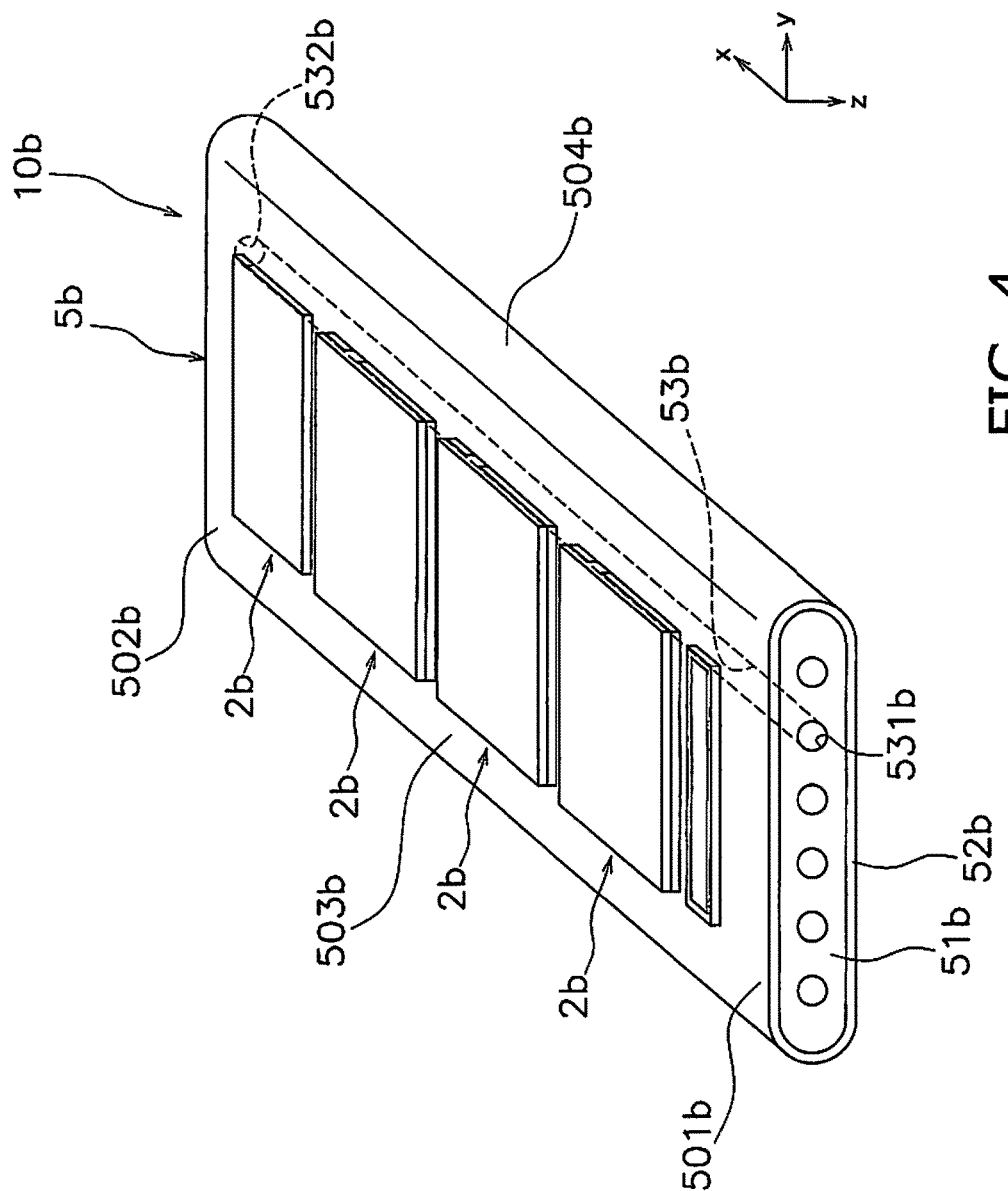
FIG. 4 is a perspective view of a second cell.
Figure 5:
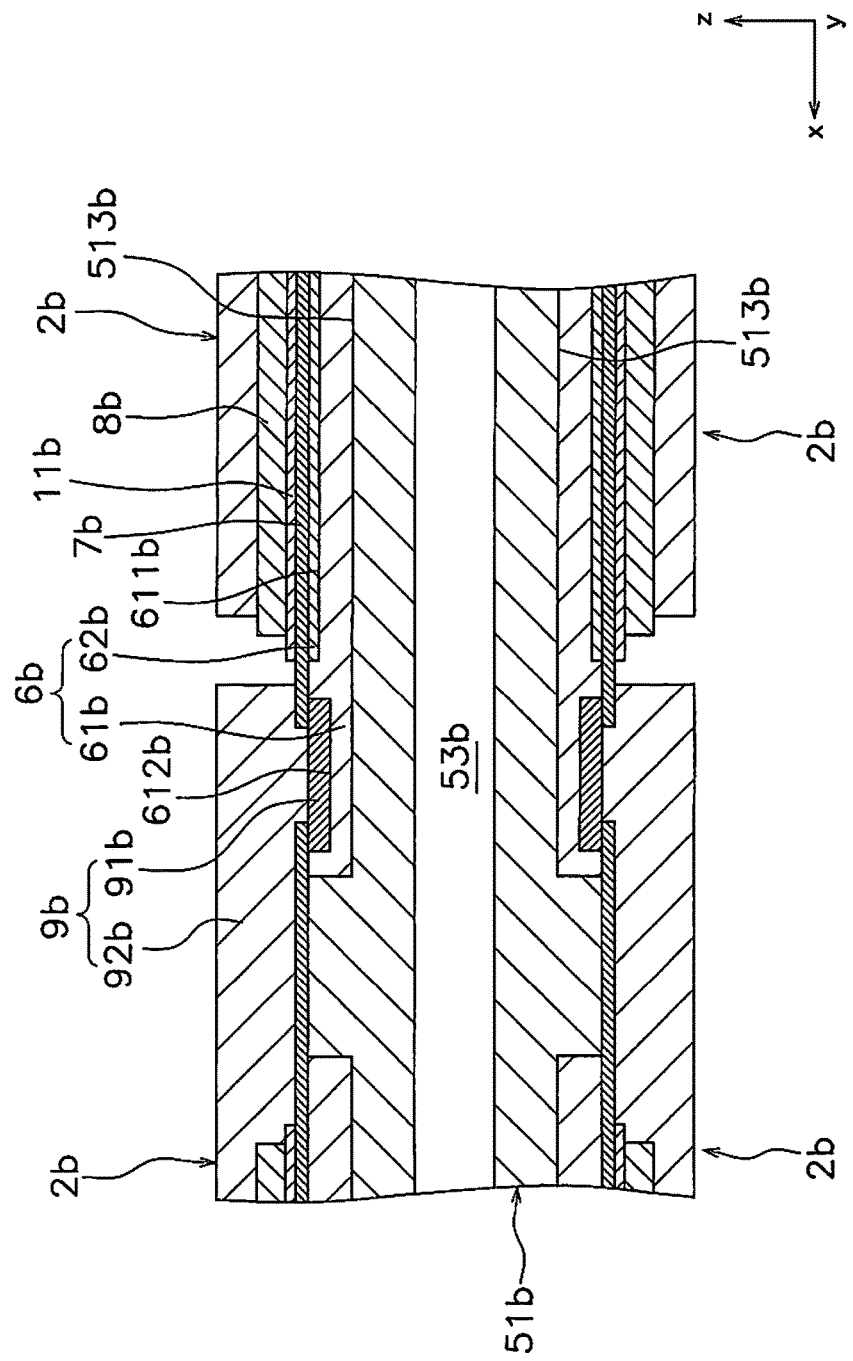
FIG. 5 is a sectional view of the second cell.

As illustrated in FIG. 4 and FIG. 5, the second cells 10b include a second supporting substrate 5b and second power generation elements 2b. As illustrated in FIG. 1, each second supporting substrate 5b is disposed so that the principal surfaces 503b are facing. Each second supporting substrate 5b is disposed with an interval in a direction (z axis direction) faced by the first side plate 433.

As illustrated in FIG. 4 and FIG. 5, the second supporting substrate 5b includes a second substrate main portion 51b, a second dense layer 52b and a second gas flow passage 53b. Furthermore, the second supporting substrate 5b includes a proximal end portion 501b and a distal end portion 502b. The proximal end portion 501b of the second supporting substrate 5b is inserted into the second insertion hole of the manifold 4. The second substrate main portion 51b supports the plurality of second power generation elements 2b. The second dense layer 52b covers the second substrate main portion 51b. The second gas flow passage 53b extends from the proximal end portion 501b to the distal end portion 502b of the second supporting substrate 5b.

The second power generation element 2b includes a second anode 6b, a second electrolyte 7b and a second cathode 8b. As described above, each second cell 10b has substantially the same configuration as the first cells 10a, and therefore detailed description will be omitted. The second power generation element 2b may have a larger surface area in contact with fuel gas than the first power generation element 2a. That is to say, the surface area of the second anode 6b may be larger than the surface area of the first anode 6a. Furthermore, the surface area of the second cathode 8b may be larger than the surface area of the first cathode 8a. It is naturally the case that the surface area of the second anode 6b may be the same as the surface area of the first anode 6a, and may be smaller than the surface area of the first anode 6a. In addition, the surface area of the second cathode 8b may be the same as the surface area of the first cathode 8a, or may be smaller than the surface area of the first cathode 8a.

As illustrated in FIG. 1, each of the first supporting substrates 5a is disposed with an interval so that the principal surfaces 503a are facing. Each of the second supporting substrates 5b is disposed with an interval so that the principal surfaces 503b are facing. The first supporting substrates 5a and the second supporting substrates 5b are disposed side by side with reference to the transverse direction (y axis direction). The first and second supporting substrates 5a, 5b are disposed so that the side surface 504a of the first supporting substrate 5a and the side surface 504b of the second supporting substrate 5b are facing. A space is formed between the first supporting substrate 5a and the second supporting substrate 5b. For example, the space is of about 0.5 to 10 mm.

Communicating Member

Figure 6:
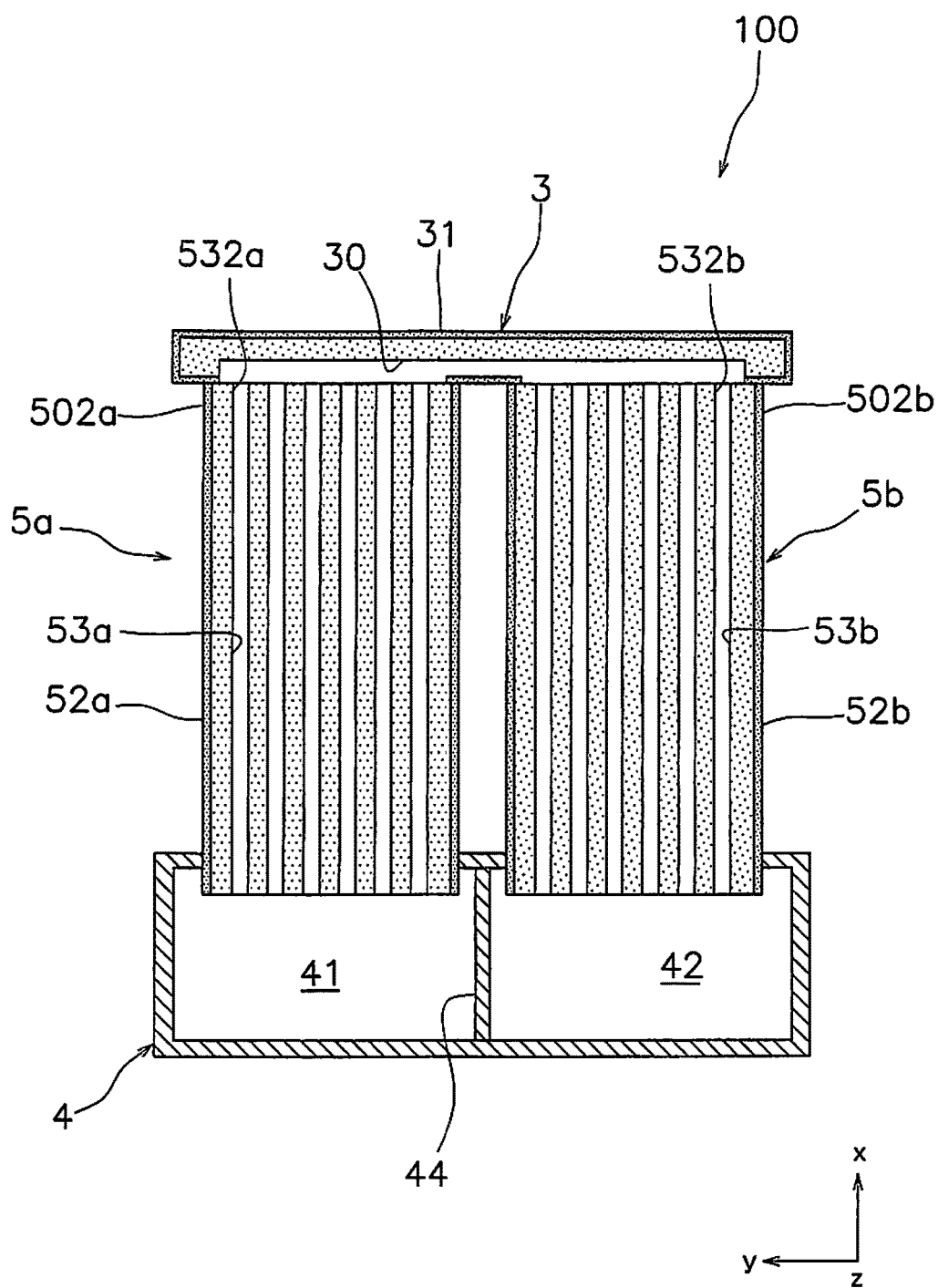
FIG. 6 is a sectional view of the fuel cell stack.

As illustrated in FIG. 6, the communicating member 3 extends across the distal end portion 502a of the first supporting substrate 5a and the distal end portion 502b of the second supporting substrate 5b. The communicating member 3 includes a passage 30 that communicates with the first gas flow passage 53a and the second gas flow passage 53b. More specifically, the passage 30 communicates with the distal end portion 532a of each first gas flow passage 53a and the distal end portion 532b of each second gas flow passage 53b. The passage 30 is configured as a cavity that extends from each first gas flow passage to each second gas flow passage. The communicating member 3 is preferably bonded to the first supporting substrate 5a and the second supporting substrate 5b.

The communicating member 3 is porous. The communicating member 3 includes a third dense layer 31 that configures its outer surface. The third dense layer 31 is formed to be denser than the main body of the communicating member 3. For examples, the porosity of the third dense layer 31 is about 0 to 7%. The third dense layer 31 may be formed using the same material as the communicating member, an electrolytic material, or crystallized glass or the like.

Method of Power Generation

The fuel cell stack 100 configured as described above is configured to supply a fuel gas such as hydrogen gas or the like to the first chamber 41 of the manifold 4, and expose the first and the second cells 10a, 10b to a gas that includes oxygen, such as air or the like. More specifically, air is supplied between adjacent first cells 10a, and between adjacent second cells 10b. In this manner, a chemical reaction as shown by Formula (1) below occurs in the first cathode 8a and the second cathode 8b, a chemical reaction as shown by Formula (2) below occurs in the first anode 6a and the second anode 6b, and thereby a current is caused to flow.

$$(1/2) \cdot O_2 + 2e^- \rightarrow O_2^-  \quad (1)$$

$$H_2 + O_2^- \rightarrow H_2O + 2e^- \quad (2)$$

More specifically, the fuel gas supplied to the first chamber 41 flows into the first gas flow passage 53a of each first cell 10a, and thereby a chemical reaction as shown by Formula (2) occurs in the first anode 6a of each first power generation element 2a. The unreacted fuel gas in each first anode 6a exits the first gas flow passage 53a, and is supplied through the passage 30 of the communicating member 3 to the second gas flow passage 53b. The fuel gas supplied to the second gas flow passage 53b undergoes a chemical reaction as shown by Formula (2) in the second anode 6b of the second cell 10b. The unreacted fuel gas in the second anode 6b is recovered into the second chamber 42 of the manifold 4.

MODIFIED EXAMPLES

Although the embodiments of the present invention have been described, the present invention is not limited to those embodiments, and various changes or modifications may be added within a scope that does not depart from the scope of the invention.

Modified Example 1

For example, in the above embodiment, fuel gas is supplied to the first chamber 41, and fuel gas is discharged from the second chamber 42. However there is no particular limitation in relation to the flow of the fuel gas, and for example, fuel gas may be supplied to the second chamber 42, and fuel gas may be discharged from the first chamber 41. That is to say, the fuel gas may flow in the order of second gas flow passage, communicating member 3, and first gas flow passage.

Modified Example 2

In the above embodiment, although the first supporting substrate 5a includes a plurality of the first gas flow passages 53a, the number of the first gas flow passages 53a may be one. In such a configuration, the first gas flow passage 53a preferably has a flat shape.

Modified Example 3

In the above embodiment, although the first cell 10a and the second cell 10b are aligned with the longitudinal direction (z axis direction) of the manifold 4, they may configured side by side in the transverse direction (y axis direction) of the manifold 4.

Modified Example 4

In the above embodiment, although the communicating member 3 is porous, the communicating member 3 may be formed by metal. More specifically, the communicating member 3 may be configured by an Fe—Cr alloy, a Ni-based alloy, or an MgO-type ceramic material (which may be the same as the supporting substrate material), or the like.

Modified Example 5

Figure 7:
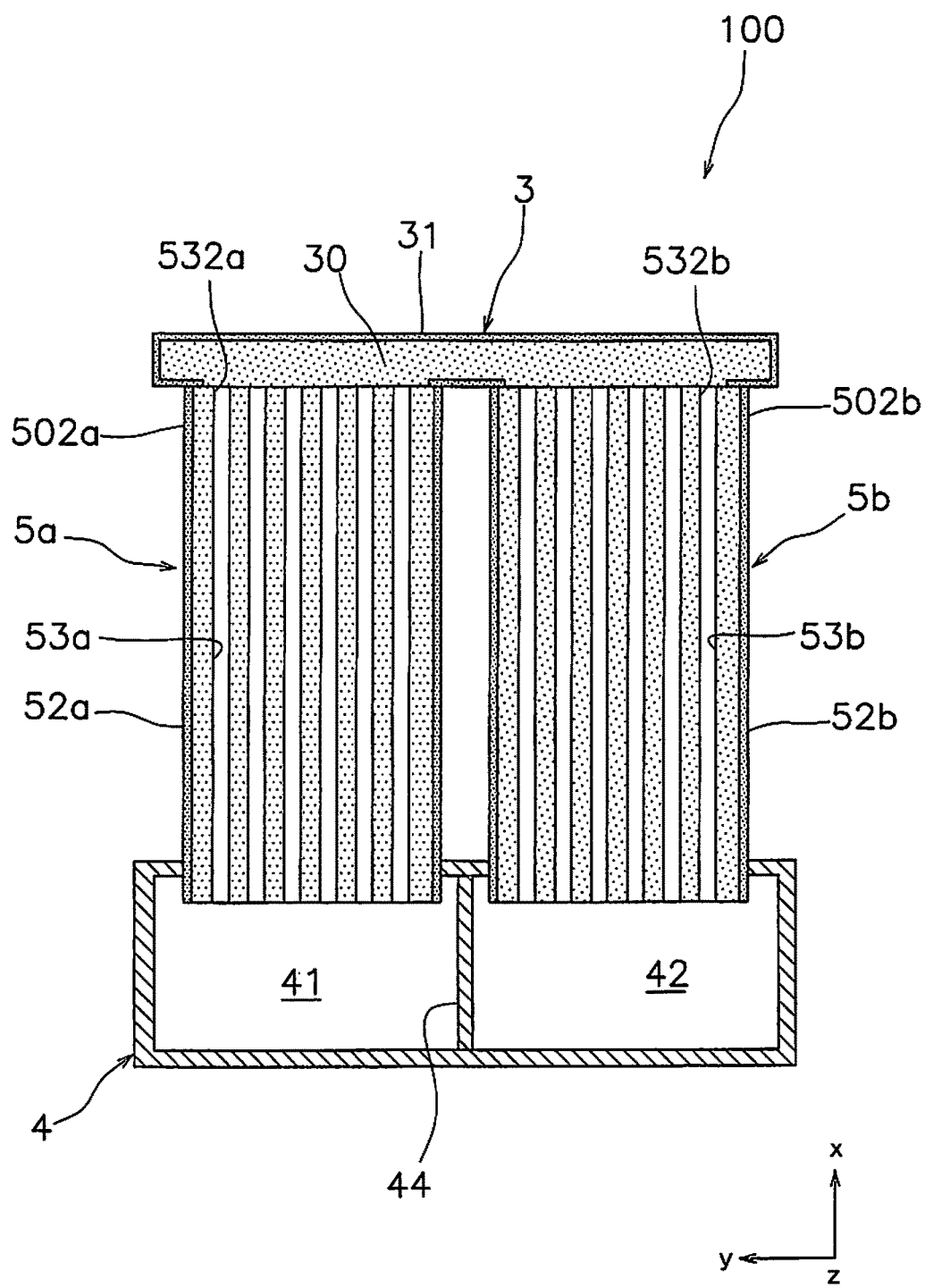
FIG. 7 is a sectional view of a fuel cell stack according to Modified Example 5.

In the above embodiment, although the passage 30 of the communicating member 3 is formed by a cavity, there is no limitation in relation to the configuration of the passage 30 of the communicating member 3. For example, as illustrated in FIG. 7, the passage 30 of the communicating member 3 may be configured by a plurality of pores formed in the communicating member 3.

Modified Example 6

Figure 8:
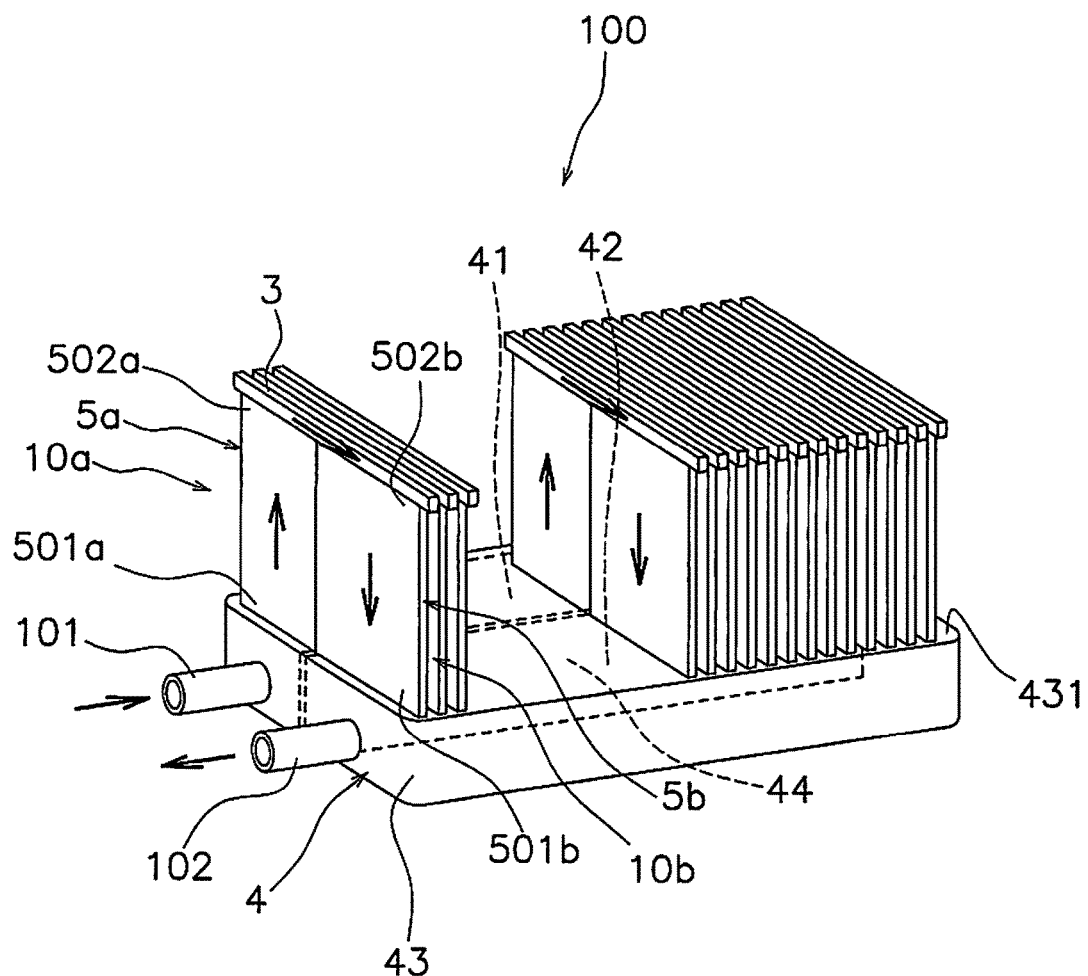
FIG. 8 is a perspective view of a fuel cell stack according to Modified Example 6.
Figure 9:
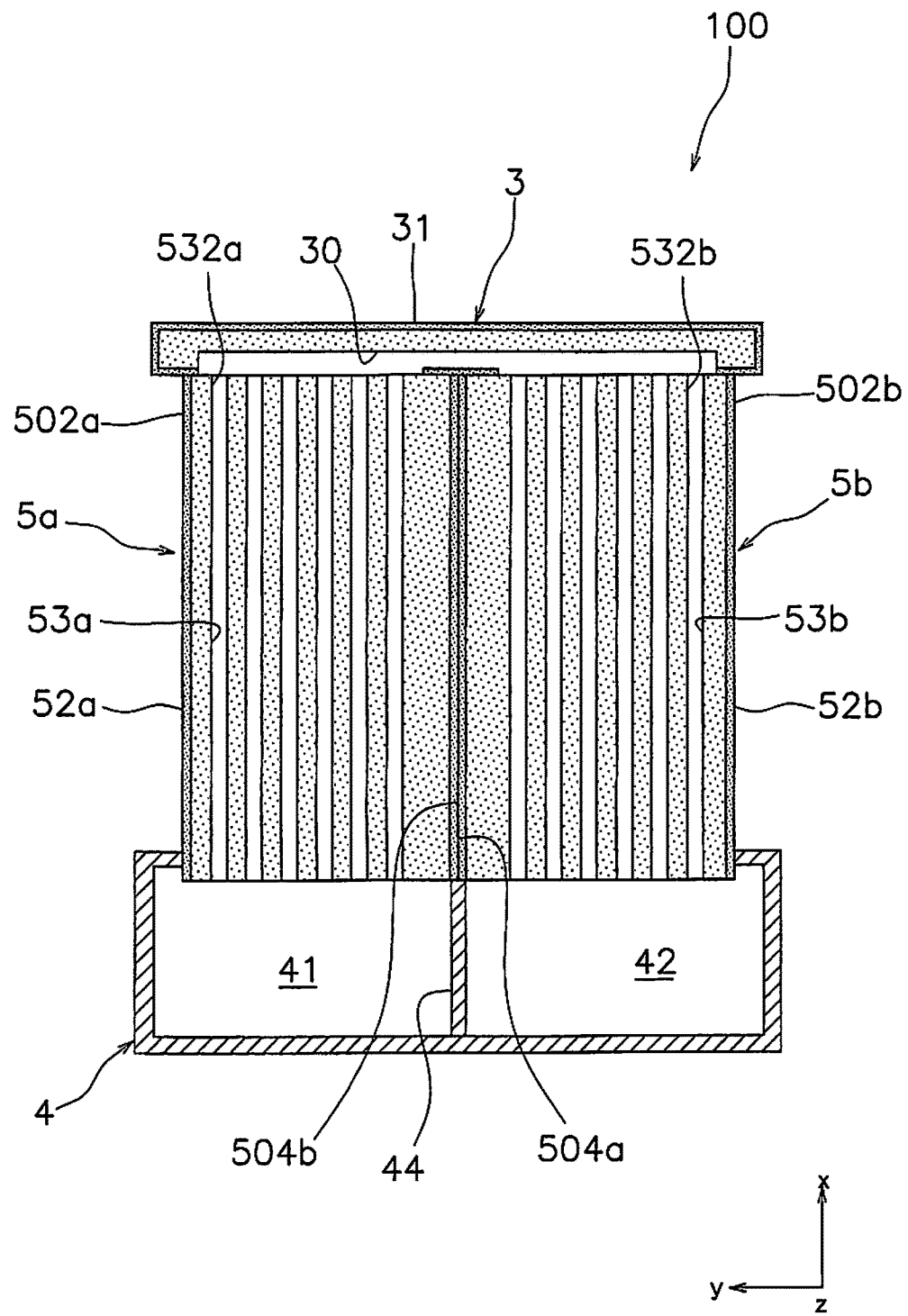
FIG. 9 is a sectional view of a fuel cell stack according to Modified Example 6.

In the above embodiment, although the side surface 504a of the first supporting substrate 5a and the side surface 504b of the second supporting substrate 5b are disposed to thereby form a space, there is no limitation in this regard. For example, as illustrated in FIG. 8 and FIG. 9, the interval between side surface 504a of the first supporting substrate 5a and the side surface 504b of the second supporting substrate 5b may be sealed. For example, the first supporting substrate 5a and the second supporting substrate 5b may be disposed to make mutual contact in the transverse direction (y axis direction). That is to say, the side surface 504a of the first supporting substrate 5a and the side surface 504b of the second supporting substrate 5b are in mutual contact.

In this configuration, the first insertion hole and the second insertion hole may be connected. That is to say, one insertion hole may be configured by the first insertion hole and the second insertion hole. The first cell 10a is inserted into the insertion hole, and the bottom end surface of the first cell 10a is exposed in the first chamber 41. The second cell 10b is inserted into the insertion hole, and the bottom end surface of the second cell 10b is exposed in the second chamber 42. Each insertion hole may extend across the first chamber 41 and the second chamber 42, or may be respectively formed with the first chamber 41 and the second chamber 42.

Modified Example 7

Figure 10:
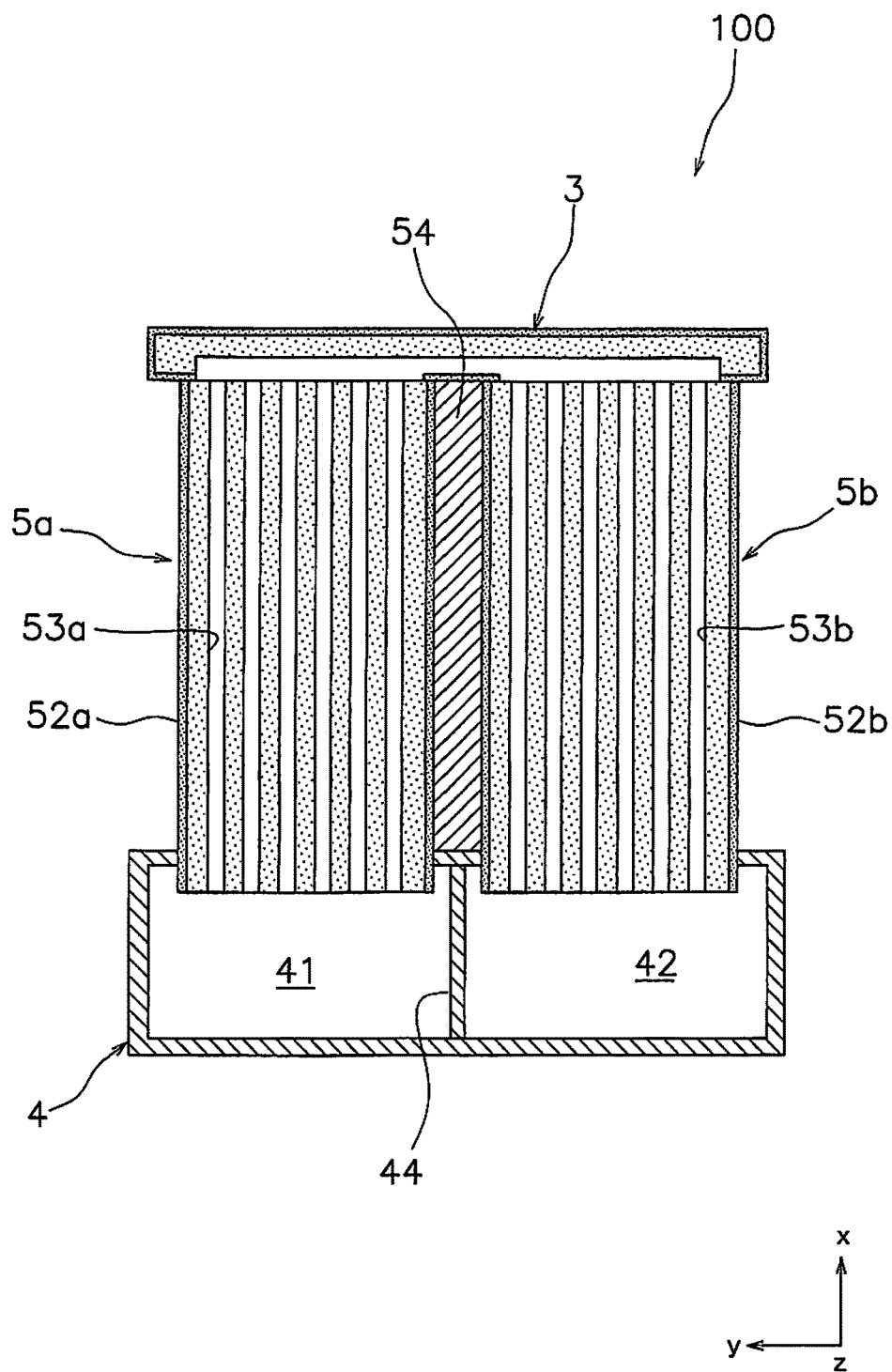
FIG. 10 is a sectional view of a fuel cell stack according to Modified Example 7.

In Modified Example 6, although the side surface 504a of the first supporting substrate 5a and the side surface 504b of the second supporting substrate 5b are in contact, for example, as illustrated in FIG. 10, the first supporting substrate 5a and the second supporting substrate 5b may be disposed to form an interval in the transverse direction (y axis direction). A filling member 54 may be disposed between the first supporting substrate 5a and the second supporting substrate 5b. The interval between the first supporting substrate 5a and the second supporting substrate 5b may be sealed by the filling member 54.

In Modified Examples 6 and 7, the interval between each first supporting substrate 5a and each second supporting substrate 5b is completely sealed. However, the interval between a portion of the first supporting substrates 5a and the second supporting substrates 5b may not be sealed.

Modified Example 8

Figure 11:
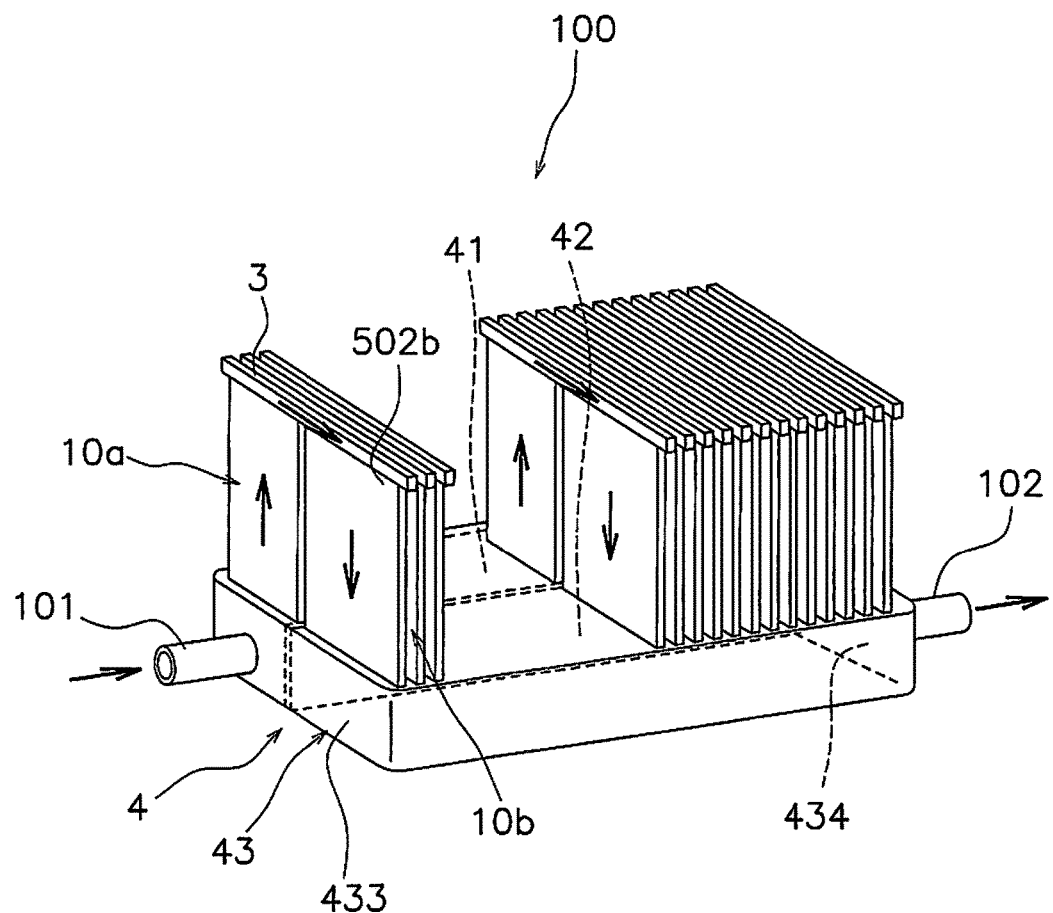
FIG. 11 is a perspective view of a fuel cell stack according to Modified Example 8.
Figure 11:
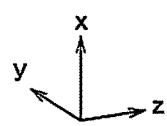

In the above embodiment, the gas supply portion 101 and the gas discharge portion 102 of the manifold 4 is formed on the same first side plate 433. However there is no particular limitation in this regard. For example, as illustrated in FIG. 11, the gas supply portion 101 may be formed on the first side plate 433, and the gas discharge portion 102 may be formed on the second side plate 434.

Modified Example 9

Figure 12:
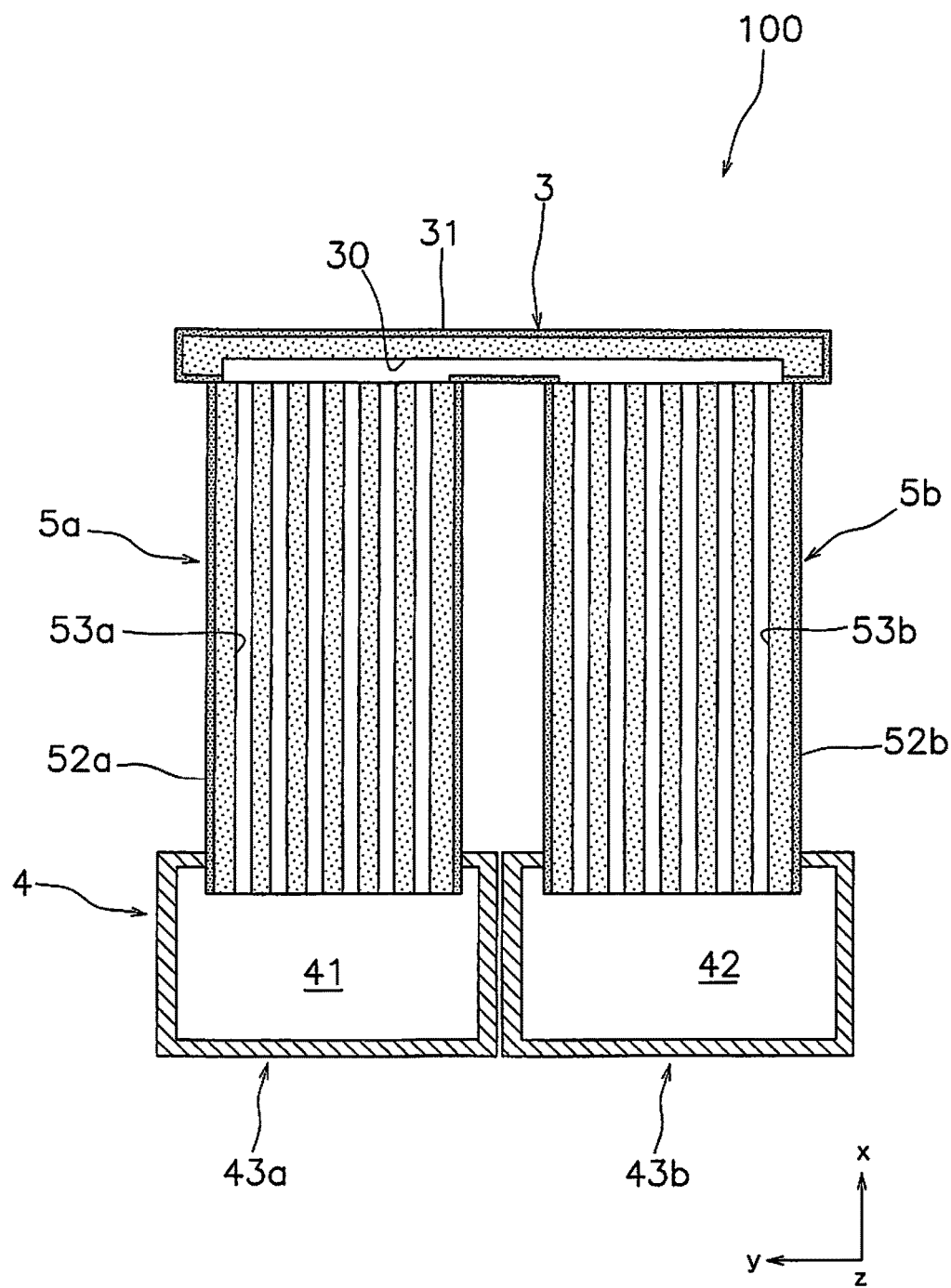
FIG. 12 is a sectional view of a fuel cell stack according to Modified Example 9.

In the above embodiment, the manifold 4 is configured by one manifold main portion 43. However, there is no limitation in relation to the configuration of the manifold 4. For example, as illustrated in FIG. 12, the manifold 4 may include a first manifold main portion 43a, and a second manifold main portion 43b. The first manifold main portion 43a includes the first chamber 41 and the second manifold main portion 43b includes the second chamber 42.

The invention claimed is:

1. A fuel cell stack comprising
a first power generation element including a first anode, a first electrolyte and a first cathode,
a first supporting substrate including a first substrate main portion supporting the first power generation element, a first dense layer covering the first substrate main portion, and a first gas flow passage extending from a proximal end portion to a distal end portion,
a second power generation element including a second anode, a second electrolyte and a second cathode,
a second supporting substrate including a second substrate main portion supporting the second power generation element, a second dense layer covering the second substrate main portion, and a second gas flow passage extending from a proximal end portion to a distal end portion, and
a communicating member extending across the distal end portion of the first supporting substrate and the distal end portion of the second supporting substrate and including a communicating passage that communicates between the first gas flow passage and the second gas flow passage.

2. The fuel cell stack according to claim 1, wherein the first supporting substrate and the second supporting substrate are disposed so that a side surface of the first supporting substrate faces a side surface of the second supporting substrate.

3. The fuel cell stack according to claim 1, wherein the first supporting substrate and the second supporting substrate are mutually disposed at an interval.

4. The fuel cell stack according to claim 1, wherein the first supporting substrate and the second supporting substrate are disposed side by side in a transverse direction, and the interval between the first supporting substrate and the second supporting substrate is sealed.

5. The fuel cell stack according to claim 4, wherein the first supporting substrate and the second supporting substrate are mutually disposed side by side in mutual contact in a transverse direction.

6. The fuel cell stack according to claim 4, wherein the fuel cell stack further comprises a filling member disposed to fill the space between the first supporting substrate and the second supporting substrate that are mutually disposed with an interval.

7. The fuel cell stack according to claim 4, wherein the fuel cell stack includes a plurality of the first supporting substrates and a plurality of the second supporting substrates, and wherein each first supporting substrate is disposed with an interval so that the principal surfaces thereof are opposed, each second supporting substrate is disposed with an interval so that the principal surfaces thereof are opposed, each first supporting substrate is disposed side by side in a transverse direction with each second supporting substrate, and the interval between at least one pair of the first supporting substrate and the second supporting substrate is sealed.

8. The fuel cell stack according to claim 1, wherein the communicating member is porous.

9. The fuel cell stack according to claim 8, wherein the communicating member includes a third dense layer that configures an outer surface.

10. The fuel cell stack according to claim 8, wherein the communicating passage is configured by pores in the communicating member.

11. The fuel cell stack according to claim 1, wherein the communicating passage in the communicating member is configured as a space that extends from the first gas flow passage to the second gas flow passage.

12. The fuel cell stack according to claim 1, wherein the communicating member is configured by metal.

13. The fuel cell stack according to claim 1, wherein the fuel cell stack includes a plurality of the first power generation elements and a plurality of the second power generation elements, and each of the first power generation elements is disposed with an interval along the longitudinal direction of the first supporting substrate, and each of the second power generation elements is disposed with an interval along the longitudinal direction of the second supporting substrate.

14. The fuel cell stack according to claim 1, wherein the fuel cell stack further includes a manifold that is configured to support the first and second supporting substrates.

15. The fuel cell stack according to claim 14, wherein the manifold includes a first chamber and a second chamber, the first gas flow passage communicates with the first chamber, and the second gas flow passage communicates with the second chamber.

16. The fuel cell stack according to claim 15, wherein the manifold comprises a manifold main portion that includes a cavity, and a partition that partitions the cavity into the first chamber and the second chamber.

17. The fuel cell stack according to claim 15, wherein the manifold comprises a first manifold main portion that includes the first chamber and a second manifold main portion that includes the second chamber.

18. The fuel cell stack according to claim 15, wherein the manifold further comprising a gas supply portion connected to the first chamber and a gas discharge portion connected to the second chamber.

19. The fuel cell stack according to claim 18, wherein the gas supply portion is formed on a first side plate of the manifold, and the gas discharge portion is formed on a second side plate of the manifold disposed on the opposite side to the first side plate.

20. The fuel cell stack according to claim 18, wherein the gas supply portion and the gas discharge portion are formed on the first side plate of the manifold.

21. The fuel cell stack according to claim 19, wherein the fuel cell stack comprises a plurality of the first supporting substrates and a plurality of the second supporting substrates, wherein each of the first supporting substrates is mutually disposed at an interval in a direction that is faced by the first side plate, and each of the second supporting substrates is mutually disposed at an interval in a direction that is faced by the first side plate.

22. The fuel cell stack according to claim 1, wherein the first dense layer includes a first electrolyte, and the second dense layer includes a second electrolyte.

* * * * *